D. BUDD.
Feather Renovator.
No. 78,421.
Patented June 2, 1868.
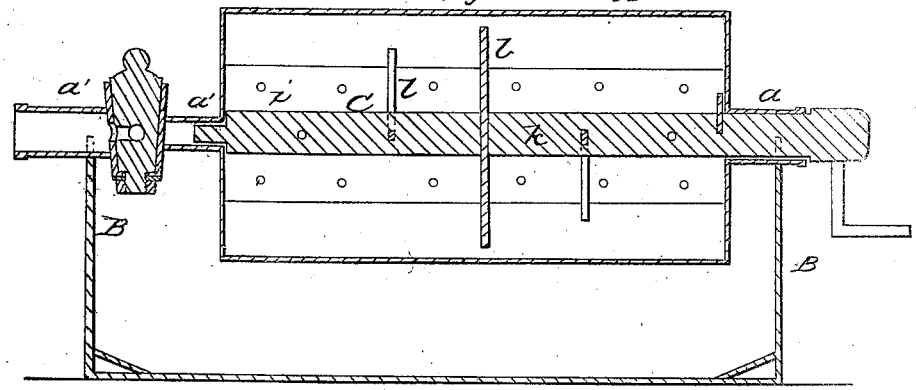
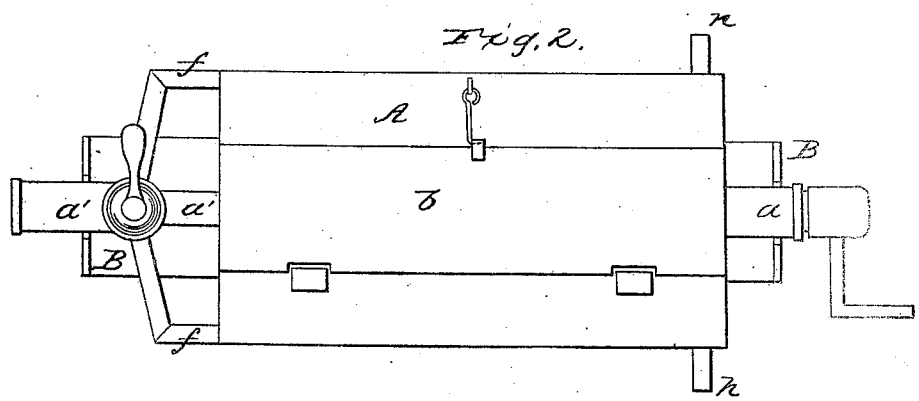
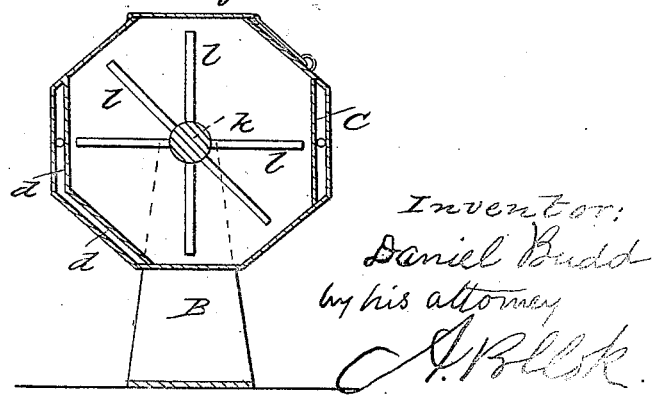

UNITED STATES PATENT OFFICE.

DANIEL BUDD, OF VALATIA, NEW YORK.

IMPROVED MACHINE FOR CLEANING AND RENOVATING FEATHERS.

Specification forming part of Letters Patent No. 78,421, dated June 2, 1868.

*To all whom it may concern:*

Be it known that I, DANIEL BUDD, of Valatia, in the county of Columbia and State of New York, have invented certain new and useful Improvements in Apparatus for Curing or Renovating and Cleaning Feathers; and I hereby declare the following to be a full, clear, and exact description of the same, reference being had to the accompanying drawings, in which—

Figure 1 is a longitudinal central section of my improved apparatus. Fig. 2 is a top view, and Fig. 3 a transverse vertical section, of the same.

The object of my invention is to provide a ready and simple means for cleansing and curing feathers used for making beds and other purposes; and it consists, essentially, of a feather-holding vessel or cylinder combined with steam-jackets, for either discharging steam into the body of said cylinder or heating the said cylinder without admitting steam thereto, and agitators or beaters arranged within this vessel for the purpose of stirring the feathers, and subjecting them all to the equal action of the steam or the heat.

To enable those skilled in the art to understand and use my invention, I will now proceed to describe the manner in which the same is or may be carried into effect by reference to the drawings accompanying and forming part of this specification.

The apparatus there shown consists of a feather receptacle or cylinder, A, of any suitable size and conformation, supported in suitable uprights or bearings, B, in the journals $a$ $a'$, which are made hollow, as shown in Fig. 1, for the purpose hereinafter specified. A door, $b$, is provided, by means of which access may be had to the interior of the cylinder. In order to impart the necessary heat to the vessel, and to introduce within it the steam needed in order to thoroughly cleanse and renovate the feathers, the jackets $c$ $d$ are formed so as to partially surround and to extend the whole length of the vessel. Steam is supplied to these jackets by means of the branch pipes $f$ $f$, which extend from the hollow journal $a'$, in which the nozzle or end of a steam-pipe leading from a suitable steam-generator is inserted. The passage of the steam is controlled by a two-way cock, $g$, by means of which steam can be let into either or both of the jackets $d$ $c$, according to the necessity of the case. Each of the jackets is provided with an outlet, $h$, for the escape of the steam received from the branch-pipe $f$, and the inner wall of the smaller jacket $c$ is perforated or pierced with a series of holes, $i$, through which the steam discharged into the jacket finds its way into the interior of the cylinder or vessel. The jacket $d$, which is of greater dimensions than the other, is used only to dry the feathers, and does not communicate with the interior of the cylinder. In order to beat or stir the feathers so as to insure that they all shall be properly steamed and heated, a shaft or spindle, $k$, provided with a series of arms or beaters, $l$, is placed in the cylinder, its ends being mounted in the ends or hollow hubs or journals of the cylinder. One end of the spindle passes out from the cylinder and has attached to it a crank, by means of which a rotary movement can be given to the beater-arm. And I would here remark that the journals $a$ $a'$ can be mounted in their bearings so as to allow the cylinder to be rotated; for it might be advantageous at times to give this motion to the cylinder, in order to thoroughly shake up and separate the feathers. In this case there would be no necessity of rotating the shaft $k$.

From the foregoing description, the operation of the apparatus will be readily understood. After placing in the cylinder, through the door, the feathers to be cleansed or cured, steam is turned on, by means of the cock, into either or both of the jackets $c$ $d$, and the beater spindle or shaft is revolved. The steam which enters through the perforations $i$ cleanses the feathers, which are stirred or thrown up by the beaters $l$, so as to expose every portion of them to the action of the steam, and when this is accomplished, steam is shut off from the jacket $c$, and passes only into jacket $d$, the heat from which soon dries or cures the feathers, the heater $v$ being revolved as before, so as to facilitate the drying operation. In this manner I am enabled to prepare fresh feathers, and to renovate those which have for any cause become unfitted for use, expeditiously and thoroughly, and without trouble.

Having now described my invention, and the manner in which the same is or may be carried into effect, what I claim, and desire to secure by Letters Patent, is—

1. An apparatus for cleansing and drying feathers, consisting of a feather-holding vessel heated by means of steam admitted either into the vessel, or into a jacket or jackets applied thereto, and combined with beaters or agitators for stirring the feathers within said vessel, substantially as and for the purposes shown and set forth.

2. The combination, with the feather-holding vessel, of the steam jackets or chambers upon the exterior of the same, one of said chambers being perforated, so as to allow steam to pass into the interior of said vessel, and the branch pipes and cock for supplying the steam to said chambers, under the arrangement and for operation as set forth.

3. The combination, with the jacketed feather-holding vessel, as described, of the rotary beaters or arms, and spindle and crank, with which they are connected, mounted in the said vessel, substantially in the manner and for the purposes herein shown and set forth.

In testimony whereof I have signed my name to this specification before two subscribing witnesses.

DANIEL BUDD.

Witnesses:
 J. CARPENTER,
 F. VAN SANTVOORD.